3,557,111
N AND N,N-ALKYL, ACYL AND ARYL-SULFAMYL-TETRAHYDROQUINAZOLINONES
Bola Vithal Shetty, 100 Beckwith Terrace,
Rochester, N.Y. 14610
No Drawing. Filed Mar. 29, 1968, Ser. No. 717,437
The portion of the term of the patent subsequent to Dec. 26, 1984, has been disclaimed and dedicated to the Public
Int. Cl. C07d 51/48
U.S. Cl. 260—256.5
7 Claims

ABSTRACT OF THE DISCLOSURE

A class of compound having diuretic properties has the following formula:

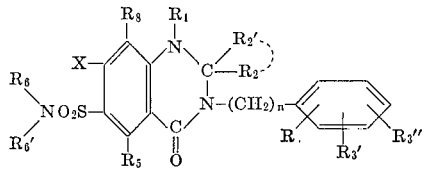

including the pharmaceutically acceptable salts thereof, in which X is halogen or trifluoromethyl; $R_6$ and $R_6'$ are loweralkyl, phenyl, or phenylloweralkyl; or $R_6$ is hydrogen and $R_6'$ is acyl such as acetyl or $C_3H_7CO$, or phenylloweralkyl or phenylloweralkyl; $R_2$ and $R_2'$ are hydrogen, loweralkyl, loweralkenyl, thioloweralkyl, alkylthio, halogen substituted loweralkyl, phenylalkyl, phenyl, cycloalkyl, cycloalkylloweralkyl, loweralkoxy, loweralkoxyloweralkyl, or $R_2$ and $R_2'$ together are a lower polymethylene chain morpholino, pyrrolidino, or piperazino; $R_1$ is hydrogen, phenylalkyl, hydroxyalkyl, loweralkoxyloweralkyl, or loweralkyl; $R_5$ and $R_8$ are hydrogen, loweralkyl, amino, loweralkoxy or loweralkoxyloweralkyl; $R_3$, $R_3'$, and $R_3''$ are hydrogen, loweralkyl, hydroxy, loweralkoxy, lower-alkoxyloweralkyl, halogen, trifluoromethyl, sulfamyl, or amino, and $n$ is an integer from 0–4.

The invention relates to N-substituted, and N,N-disubstituted N-alkyl, acyl and aryl-sulfamyl-tetrahydroquinazolinones, and more particularly to such compounds having an aryl or aralkyl group in the 3-position with the substituted sulfamyl in the 6-position and halo or trifluoromethyl in the 7-position. The other positions may be hydrogen or any of the substituents present in quinazolinone and thiazide diuretics. All these compounds have diuretic and saluretic properties, and when administered to warm blooded animals such as rats and dogs in the same manner and amount as for other diuretics, particularly quinethazone, are safe and effective diuretics.

The compound 2-methyl-3-o-tolyl-6-N,N-dimethylsulfamyl-7-chloro-1,2,3,4 - tetrahydro - 4(3H)quinazolinone, has very similar diuretic properties to the sulfamyl compound of Example 1 of my Pat. 3,360,518, the pharmacology of which is given in my patent. This is likewise true of the compound where hydrogen is in the 2-position. The other compounds are at least as effective as quinethazone.

The preferred diuretic compounds of my invention have the formula:

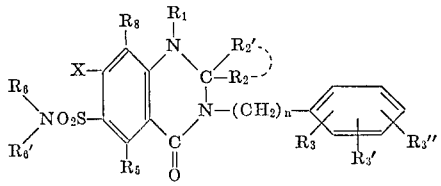

including the pharmaceutically acceptable salts thereof, in which X is halogen or trifluoromethyl; $R_6$ and $R_6'$ are loweralkyl, phenyl, or phenylloweralkyl; or $R_6$ is hydrogen and $R_6'$ is acyl such as acetyl or $C_3H_7CO$, and the like, or phenylloweralkyl or phenylloweralkyl; $R_2$ and $R_2'$ are hydrogen, loweralkyl, loweralkenyl, thioloweralkyl, alkylthio, halogen substituted loweralkyl, phenylalkyl, phenyl, cycloalkyl, cycloalkylloweralkyl, loweralkoxy, loweralkoxyloweralkyl, or $R_2$ and $R_2'$ together are a lower polymethylene chain morpholino, pyrrolidino, or piperazino; $R_1$ is hydrogen, phenylalkyl, hydroxyalkyl, loweralkoxyloweralkyl, or loweralkyl; $R_5$ and $R_8$ are hydrogen, loweralkyl, amino, loweralkoxy or loweralkoxyloweralkyl; $R_3$, $R_3'$, and $R_3''$ are hydrogen, loweralkyl, hydroxy, loweralkoxy, loweralkoxyloweralkyl, halogen, trifluoromethyl, sulfamyl, or amino, and $n$ is an integer from 0–4.

In the above Formula X is preferably chlorine or trifluoromethyl, but bromine and the other halogens are not precluded. $R_1$ is preferably hydrogen, but loweralkyls such as methyl, ethyl, propyl, and isopropyl may be used. $R_2$ is preferably hydrogen, methyl or ethyl. The thioalkyl, when used, is preferably a thioloweralkyl; the halogen of the halogen substituted alkyl is chlorine or other halogen. The aralkyl is preferably a monocyclic carbocyclic aryl loweralkyl, e.g. benzyl, but bicyclic carbocyclic aralkyl may be used, e.g. 1 or 2 naphthylmethyl. $R_3$, $R_3'$, and $R_3''$ may be any of the stated radicals in one or more of the ortho, meta or para positions. Preferably $R_3$ is methyl in the ortho position, also where sulfamyl is used it is preferably present in the meta or para position with methyl in the ortho position. $R_2$ may be aryl and is preferably like the aryl part of the aralkyl of $R_2$. The substituted aryl of $R_2$ and the substituted aralkyl of $R_2$ are suitably substituted with hydroxy, alkoxy (preferably loweralkoxy), loweralkyl, halogen, $SO_2NH_2$, trifluoromethyl, and $NH_2$.

Specific suitable compounds of the above formula include 2-methyl-3-o-tolyl-6-N,N-dimethylsulfamyl-7-chloro-1,2,3,4-tetrahydro-4-quinazolinone;
2-methyl-3-o-tolyl-6-N,N-dimethylsulfamyl-7-trifluoromethyl-1,2,3,4-tetrahydro-4-quinazolinone;
3-o-tolyl-6-n,N-dimethylsulfamyl-7-chloro-1,2,3,4-tetrahydro-4-quinazolinone;
2-ethyl-3-o-tolyl-6-N,N-dimethylsulfamyl-7-trifluoromethyl-1,2,3,4-tetrahydro-4-quinazolinone;
2-ethyl-3-o-tolyl-6-N,N-dimethylsulfamyl-7-chloro-1,2,3,4-tetrahydro-4-quinazolinone;
2-methyl-3-o-tolyl-6-methylaminosulfonyl-7-chloro-1,2,3,4-tetrahydro-4-quinazolinone;
2-methyl-3-(p-chlorophenyl)-6-N,N-dimethylsulfamyl-7-chloro-1,2,3,4-tetrahydro-4-quinazolinone;
2-methyl-3-o-tolyl-6-methylaminosulfonyl-7-chloro-1,2,3,4-tetrahydro-4-quinazolinone;
2-methyl-3-phenyl-6-N,N-dimethylsulfamyl-7-chloro-1,2,3,4-tetrahydro-4-quinazolinone;
2-methyl-3-(2'-methyl-3'-chlorophenyl)-6-N,N-dimethylsulfamyl-7-chloro-1,2,3,4-tetrahydro-4-quinazolinone;
2-methyl-3-(p-chlorophenyl)-6-methylaminosulfonyl-7-chloro-1,2,3,4-tetrahydro-4-quinazolinone;
2-methyl-3-(2'-methylbenzyl)-6-N,N-dimethylsulfamyl-7-chloro-1,2,3,4-tetrahydro-4-quinazolinone;
2-phenyl-3-o-tolyl-6-N,N-dimethylsulfamyl-7-chloro-1,2,3,4-tetrahydro-4-quinazolinone;
2-propyl-3-o-tolyl-6-N,N-dimethylsulfamyl-7-chloro-1,2,3,4-tetrahydro-4-quinazolinone;
2-butyl-3-o-tolyl-6-N,N-dimethylsulfamyl-7-chloro-1,2,3,4-tetrahydro-4-quinazolinone;
2-propyl-3-o-tolyl-6-N,N-dimethylsulfamyl-7-trifluoromethyl-1,2,3,4-tetrahydro-4-quinazolinone;
2-butyl-3-o-tolyl-6-N,N-dimethylsulfamyl-7-trifluoromethyl-1,2,3,4-tetrahydro-4-quinazolinone;

2-benzylthiomethyl-3-o-tolyl-6-N,N-dimethylsulfamyl-7-chloro-1,2,3,4-tetrahydro-4-quinazolinone;
2-(2,2,2-trifluoroethylthiomethyl)-3-o-tolyl-6-N,N-dimethylsulfamyl-7-chloro-1,2,3,4-tetrahydro-4-quinazolinone;
2-ethylthiomethyl-3-o-tolyl-6-N,N-dimethylsulfamyl-7-chloro-1,2,3,4,-tetrahydro-4-quinazolinone;
2-chloromethyl-3-o-tolyl-6-N,N-dimethylsulfamyl-7-chloro-1,2,3,4-tetrahydro-4-quinazolinone;
2-dichloromethyl-3-o-tolyl-6-N,N-dimethylsulfamyl-7-chloro-1,2,3,4-tetrahydro-4-quinazolinone;
2-trichloromethyl-3-o-tolyl-6-N,N-dimethylsulfamyl-7-chloro-1,2,3,4-tetrahydro-4-quinazolinone;
2-benzyl-3-o-tolyl-6-N,N-dimethylsulfamyl-7-chloro-1,2,3,4,-tetrahydro-4-quinazolinone;
2-(3'-sulfamyl-4'-chlorophenyl)-3-o-tolyl-6-N,N-dimethylsulfamyl-7-chloro-1,2,3,4-tetrahydro-4-quinazolinone;
2-(3'-sulfamyl-4'-chlorobenzyl)-3-o-tolyl-6-N,N-dimethylsulfamyl-7-chloro-1,2,3,4-tetrahydro-4-quinazolinone;
2-methyl-3-(o-hydroxyphenyl)-6-N,N-dimethylsulfamyl-7-chloro-1,2,3,4-tetrahydro-4-quinazolinone;
2-methyl-3-(o-methoxyphenyl)-6-N,N-dimethylsulfamyl-7-chloro-1,2,3,4-tetrahydro-4-quinazolinone;
2-methyl-3-(p-aminophenyl)-6-N,N-dimethylsulfamyl-7-chloro-1,2,3,4-tetrahydro-4-quinazolinone;
2-methyl-3-(2'-methyl-4'-aminophenyl)-6-N,N-dimethylsulfamyl-7-chloro-1,2,3,4-tetrahydro-4-quinazolinone;
2-methyl-3-(2'-methyl-3'-sulfamylphenyl)-6-N,N-dimethylsulfamyl-7-chloro-1,2,3,4-tetrahydro-4-quinazolinone;
2-methyl-3-(2'-methyl-3'-sulfamylphenyl)-6-N,N-dimethylsulfamyl-7-trifluoromethyl-1,2,3,4-tetrahydro-4-quinazolinone;
2-ethyl-3-(2'-methyl-3'-chlorophenyl)-6-N,N-dimethylsulfamyl-7-trifluoromethyl-1,2,3,4-tetrahydro-4-quinazolinone;
2-methyl-3-(2'-methyl-3'-chlorophenyl)-6-methylaminosulfonyl-7-chloro-1,2,3,4-tetrahydro-4-quinazolinone;
2-ethyl-3-(2'-sulfamylphenyl)-6-N,N-dimethylsulfamyl-7-chloro-1,2,3,4-tetrahydro-4-quinazolinone;
2-cyclopentylmethyl-3-o-tolyl-6-N,N-dimethylsulfamyl-7-chloro-1,2,3,4-tetrahydro-4-quinazolinone;
2-cyclobutyl-3-o-tolyl-6-N,N-dimethylsulfamyl-7-chloro-1,2,3,4-tetrahydro-4-quinazolinone;
2-cyclobutyl-3-o-tolyl-6-N,N-dimethylsulfamyl-7-trifluoromethyl-1,2,3,4-tetrahydro-4-quinazolinone;
2-cyclopropylmethyl-3-o-tolyl-6-N,N-dimethylsulfamyl-7-chloro-1,2,3,4-tetrahydro-4-quinazolinone;
2-cyclopropyl-3-o-tolyl-6-N,N-dimethylsulfamyl-7-trifluoromethyl-1,2,3,4-tetrahydro-4-quinazolinone;
2-methyl-3-benzyl-6-N,N-dimethylsulfamyl-7-chloro-1,2,3,4-tetrahydro-4-quinazolinone;
2-pentamethylene-3-o-tolyl-6-N,N-dimethylsulfamyl-7-chloro-1,2,3,4-tetrahydro-4-quinazolinone;
1,2-dimethyl-3-o-tolyl-6-N,N-dimethylsulfamyl-7-chloro-1,2,3,4-tetrahydro-4-quinazolinone;
1-benzyl-2-methyl-3-o-tolyl-6-N,N-dimethylsulfamyl-7-chloro-1,2,3,4-tetrahydro-4-quinazolinone;
2-methyl-3-(2'-methyl-4'-chlorophenyl)-6-N,N-dimethylsulfamyl-7-chloro-1,2,3,4-tetrahydro-4-quinazolinone;
2-cyclobutylmethyl-3-o-tolyl-6-N,N-dimethylsulfamyl-7-chloro-1,2,3,4-tetrahydro-4-quinazolinone;
2-methyl-3-(2'-trifluoromethyl-4'-aminophenyl)-6-N,N-dimethylsulfamyl-7-chloro-1,2,3,4-tetrahydro-4-quinazolinone;
the sodium salt of 2-methyl-3-o-tolyl-6-N,N-dimethylsulfamyl-7-chloro-1,2,3,4-tetrahydro-4-quinazolinone, and
the potassium salt of 2-methyl-3-o-tolyl-6-N,N-dimethylsulfamyl-7-chloro-1,2,3,4-tetrahydro-4-quinazolinone.

Similar diuretic compounds to those listed above are those in which instead of the group N,N-dimethylsulfamyl there is present N,N-diethyl, N,N-dipropyl or N-methyl-N-butylsulfamyl. Likewise in place of N,N-dimethyl there may be N,N-diphenyl or N,N-phenylmethyl, and the like. N,N-diacyl may be present but for practical diuretic activity the substituent should be N-acetyl or other N-acylsulfamyl in place of the N,N-dimethylsulfamyl of the above listed compounds. It is, of course, obvious that many other specific compounds coming under the generic formula and within application's general disclosure could be listed, but it is believed that the above illustrate the invention and show the applicability of the generic statements and generic formula of this application.

The following examples are given to illustrate the preparation of the class of compounds of the invention:

EXAMPLE I 7-chloro-6-acetyl sulfamyl-2-methyl-3-(o-tolyl)-1,2,3,4-tetrahydro-4-quinazolinone Synthetic route:

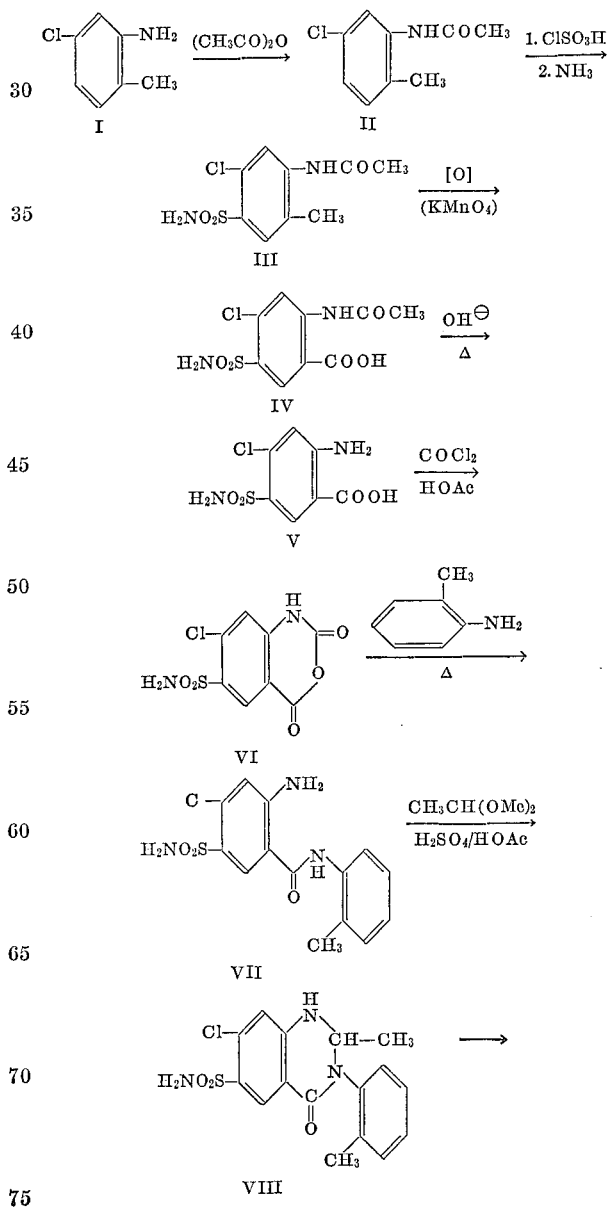

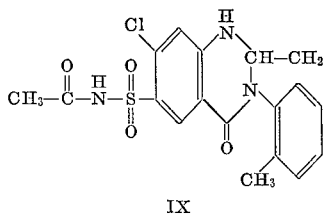

5-chloro-2-methylacetanilide (II).—5-chloro - o - toluidine (I), (1000 gm.) was added to 9000 ml. of water, preheated to 35°, in a 4½ gallon battery jar. The slurry was vigorously stirred while 1260 gm. acetic anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741–994, and 740–482. The total weight was 11 kg. from 10.4 kg. of starting material.

5-chloro - 2 - methyl - 4 - sulfamylacetanilide (II).—Chlorosulfonic acid (1000 gm.) was placed in a nitrogen flushed 5-liter, 3-neck round bottom flask fitted with a stirrer and a calcium chloride tube. 5-chloro-2-methylacetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

N-acetyl - 4 - chloro - 5 - sulfamyl anthranilic acid (IV).—Into a 12-liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water.

The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved (under lot #745–687) in 100 liters of 95% ethanol. The resulting solution was concentrated to a total volume of 10 liters, periodically filtering off the product that had crystallized out and washing this with 95% ethanol. The yield of purified product was 2500 gm. melting 264–266°, from 3 kg. of starting material.

4-chloro-5-sulfamylanthranilic acid (V).—N-acetyl-4-chloro-5-sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

7-chloro-6-sulfamylisatoic anhydride (VI).—4-chloro-5-sulfamylanthranilic acid (664 gm.) was slurried in 8000 ml. glacial acetic acid and 800 gm. liquid phosgene was added with good stirring. It was stirred vigorously for three hours at room temperature, filtered and washed with 1000 ml. acetic acid and 2000 ml. anhydrous ether. After drying in vacuo over phosphorous pentoxide, it weighed 698 gm. and melted at 290–292°. This material was combined with the lots obtained in runs 746–742, and 747–570. The total weight of product was 2214 gm. from 2000 gm. of starting material.

2 - amino - 4 - chloro-5-sulfamyl-N-(o-tolyl)-benzamide (VII).—7-chloro-6-sulfamylisatoic anhydride (720 gm.) was added to a 12 liter nitrogen flushed flask containing 4200 ml. o-toluidine and the mixture was stirred for ½ hour. It was then heated to 178° (solution occurred at 177°) and kept at about 175° for 10 minutes. It was allowed to cool to 60° by removing the heating mantle, then cooled rapidly to 25° with an ice bath. Ether (4200 ml.) was added, the mixture was stirred for a few minutes, filtered and washed thoroughly with ether. The crude product was slurried with 9000 ml. isopropanol, filtered, washed twice with 2000 ml. isopropanol, twice with 2500 ml. 8% aqueous ammonia, once with 2000 ml. water, twice with 1000 ml. isopropanol and finally three times with 2000 ml. ether. After air drying, the product weighed 560 gm. and melted at 287–289°. This partially purified amide was combined with the product obtained in runs 743–870 and 747–574 and the total (1573 gm.) was recrystallized (under lot #743–871). The amide was dissolved in 3000 ml. dimethylformamide, filtered with Celite and heated to 90°. To the resulting solution was added all at once, 1800 ml. 95° water. The suspension that resulted was allowed to cool with stirring over 20 hours, then filtered and washed with 1000 ml. 2:1 dimethylformamide:water, 2000 ml. methanol and 1500 ml. ether. After drying the product weighed 1488 gm. and melted at 289–292° with decomposition.

Analysis.—Calcd. for $C_{14}H_{14}ClN_3O_3S$ (percent): C, 49.48; H, 4.15; N, 12.36; Cl, 10.43; S, 9.44. Found (percent): C, 49.66; H, 4.23; N, 12.41; Cl, 10.43; S, 9.55.

2-methyl-3-(o-tolyl) - 6 - sulfamyl - 7 - chloro-1,2,3,4-tetrahydro-4-quinazolinone (VIII).—2-amino-4-chloro-5-sulfamyl-N-(o-tolyl)-benzamide (685 gm.) was slurried in 7000 ml. glacial acetic acid. To this slurry was added 240 gm. (280 ml.) dimethyl acetal and 4 ml. concentrated sulfuric acid. The reaction mixture was stirred for 3½ hours, then filtered and washed thoroughly with ether. The yield of crude material was 664 gm. and it melted at 252–253°. This was combined with 622 gm. product from an additional run and was recrystallized from 25 liters of 95% ethanol by dissolving hot, cooling, and concentrating to half volume under reduced pressure at 30°.

Weight of the first crop=685 gm., M.P. 246–250° (240–243°).

Analysis.—Calcd. for $C_{16}H_{16}ClN_3O_3S$ (percent): C, 52.53; H, 4.41; N, 11.49; Cl, 9.69; S, 8.76. Found (percent): C, 52.38; H, 4.45; N, 11.53; Cl, 9.70; S, 8.90.

7 - chloro-6-acetylsulfamyl-2-methyl-3-(o-tolyl)-1,2,3,4-tetrahydro-4-quinazolinone (IX).—7-chloro-6-sulfamyl-2-methyl-3-(o-tolyl)-1,2,3,4-tetrahydro-4-quinazolinone (25 gm.) was added to 200 ml. of dry pyridine. Complete solution was obtained. Acetic anhydride (62.5 ml.) was then added and the solution stirred at room temperature for 6 hours. The solution was then poured into 1000 ml. ice-water and the mixture made acid with concentrated hydrochloric acid. Let mixture stir for 45 minutes. Product was then filtered and air dried, yield 26.0. After two recrystallizations from acetone-water product weighed 14.6 gm., M.P. 243–246° (dec.).

Analysis.—Calcd. for $C_{18}H_{18}ClN_3O_4S$ (percent): C, 53.01; H, 4.45; Cl, 8.69; N, 10.30; S, 7.86. Found (percent): C, 52.71; H, 4.62; Cl, 8.88, 8.97; N, 10.22; S, 7.76.

EXAMPLE II 7-chloro-2-methyl-6-N-methylsulfamyl-3-(o-tolyl)-
1,2,3,4-tetrahydro-4-quinazolinone

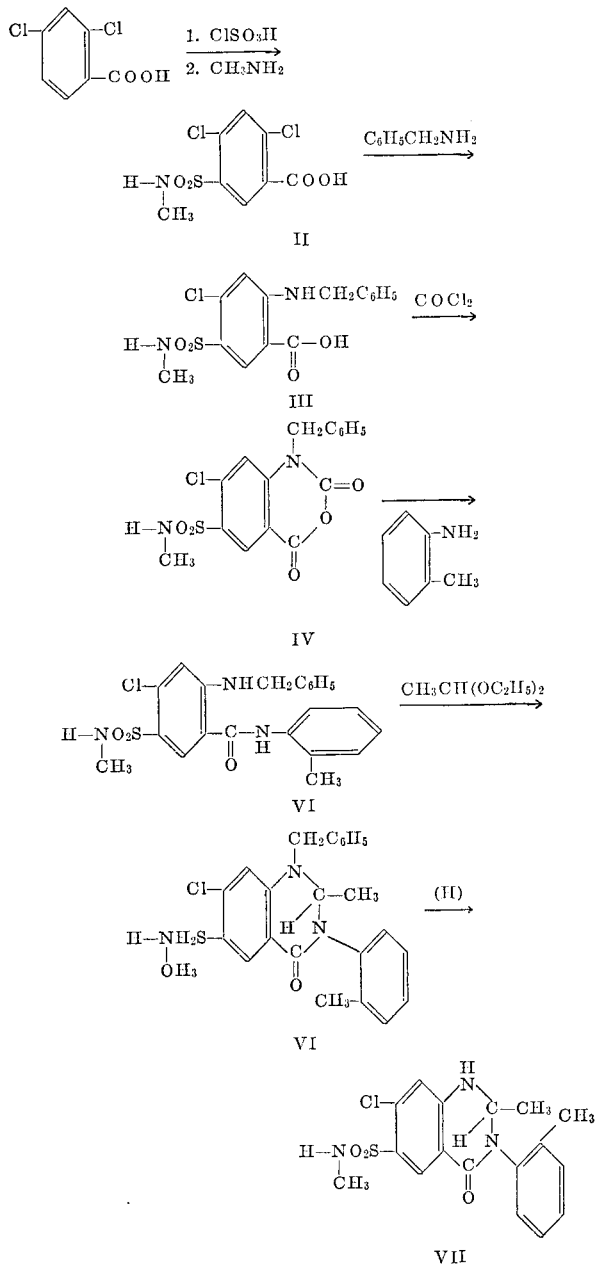

2,4 - dichloro-5 - (N - methylsulfamyl) - benzoic acid (II).—To one kilogram of chlorosulfonic acid in a nitrogen flushed 5 liter, 3 necked round bottom flask fitted with a stirrer and a calcium chloride tube was added cautiously 200 gm. 2,4-dichloro-benzoic acid. The reaction was heated to and stirred at 160° C. for four hours. The cooled reaction mixture was poured onto 10 kg. ice. The solid which formed was filtered off and water washed. Approximately 120 grams of the still wet cake was treated with 1800 ml. 40% methylamine/water. The reaction was stirred at room temperature four hours, then the solid was filtered off and dried.

Wt., 220 gm.; M.P., 228° C.

Calc'd for $C_8H_7Cl_2NO_4S$ (percent): S, 11.29. Found (percent): S, 11.05.

IR—consistent.

2-benzylamino - 4 - chloro-5-N-methylsulfamyl-benzoic acid (III).—To 130 ml. benzylamine at room temperature was added 2,4-dichloro-5-(N-methylsulfamyl)-benzoic acid (50 gm., crude). The reaction was warmed to 150° C., maintained 30 minutes, temperature lowered to 130° C., maintained 30 minutes, lowered to 90° C., maintained 2 hours—added 400 ml. water, acidified to pH 3, allowed to stand then filtered. The solid was recrystallized from 95% ethanol.

Wt., 32.0 mg.

Calc'd for $C_{15}H_{15}ClN_2O_4S$ (percent): S, 9.04. Found (percent): S, 8.96.

IR—consistent.

4-benzyl-6-chloro-7 - N - methylsulfamyl isatoic anhydride (IV).—To one hundred mls. of acetic acid was added 12.5 grams of 2-benzylamino - 4 - chloro-5 - (N-methylsulfamyl)-benzoic acid and 10 ml. liquid phosgene. The reaction was stirred 24 hours then the solid product filtered off, ether washed, dried.

Wt., 7.8 gm.; M.P., 235–8° C.

Calc'd for $C_{16}H_{13}ClN_2O_4S$ (percent): Cl, 9.31; S, 8.42. Found (percent): Cl, 9.13; S, 8.20.

2-benzylamino - 4 - chloro - 5 - (N-methylsulfamyl)-N-(o-tolyl)-benzamide (V).—To 200 ml. of toluidine was added 38.0 gm. of the 4-benzyl-6-chloro-7-N-methylsulfamyl isatoic anhydride. Temperature was raised to 170–180° C., maintained 5 minutes then allowed to cool to below 50° C. at which time it was slurried with 50% i-propanol/ether—solid was filtered off, ether washed and dried.

Wt., 30.0 gm.; M.P., 275–7° C.

Calc'd for $C_{22}H_{22}ClN_3O_3S$ (percent): C, 59.54; H, 5.00; N, 9.45; Cl, 8.00; S, 7.29. Found (percent): C, 50.21; H, 5.09; N, 9.52; Cl, 8.68; S, 7.08.

1-benzyl - 2 - methyl - 3 - (o-tolyl)-6-(N-methylsulfamyl) - 7 - chloro-1,2,3,4-tetrahydro - 4 - quinazolinone (VI).—To 120 ml. glacial acetic acid was added 7.5 gm. of 2-benzylamino - 4 - chloro - 5 - N-methylsulfamyl-N-(o-tolyl)-benzamide. To this mixture was added 6 ml. acetal followed by 10 drops $H_2SO_4$. Solution occurred within moments then followed by the separation of a solid. The solid was filtered off and recrystallized from 95% ethanol.

Wt., 4.8 gm.; M.P., 255–8° C.

Calc'd for $C_{24}H_{24}ClN_3O_3S$ (percent): C, 61.33; H, 5.15; N, 8.94; Cl, 7.54; S, 6.82. Found (percent): C, 61.17; H, 5.27; N, 9.01; Cl, 7.64; S, 6.79.

2-methyl - 3 - (o-tolyl) - 6 - sulfamyl-7-chloro-1,2,3,4-tetrahydro-4-quinazolinone (VII).—To a Parr pressure bottle was added 3.0 gm. of 1-benzyl-7-chloro-6-N-methylsulfamyl - 2 - methyl - 3 - (o-tolyl)-1,2,3,4,-tetrahydro-4-quinazolinone dissolved in 60 ml. abs. methanol with 3.0 gm. 5% palladium on charcoal. Reduction was run at room temperature at 60 p.s.i. The reaction mixture was filtered, concentrated and the solid recrystallized from 95% ethanol.

Wt., 1.5 gm.; M.P., 163–5° C.

Calc'd for $C_{17}H_{19}ClN_3O_3S$ (percent): C, 53.75; H, 4.83; N, 11.06. Found (percent): C, 53.42; H, 5.05; N, 10.83.

EXAMPLE III 7-chloro-6-(N,N-dimethylaminosulfamyl)-3-(o-tolyl)-
1,2,3,4-tetrahydro-4-quinozolinone

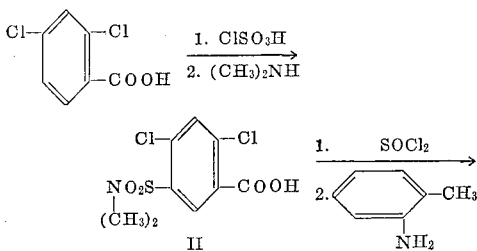

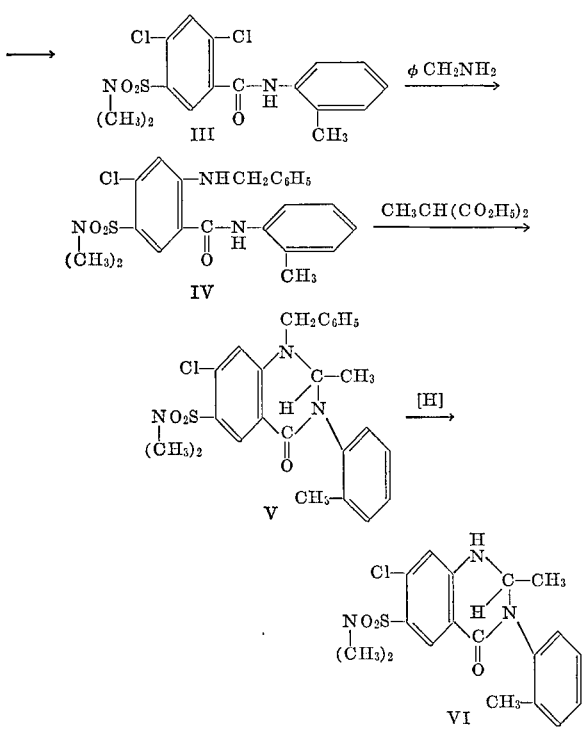

2,4-dichloro-5-(N,N - dimethylsulfamyl) - benzoic acid (II).—To one kilogram of chlorosulfonic acid in a nitrogen flushed 5 liter, 3 necked round bottom flask fitted with a stirrer and a calcium chloride tube was added cautiously 200 gm. 2,4-dichloro-benzoic acid. The reaction was heated to and stirred at 160° C. four hours. The cooled reaction mixture was poured onto 10 kg. ice. The solid which formed was filtered off and water washed. Approximately 120 grams of the still wet cake was treated with 800 ml. water to which 100 gm. dimethyl aniline was added. The reaction was stirred at room temperature four hours, then the solid was filtered off and recrystallized from (4× 400 ml.) water.

Wt., 76.0 gm.; M.P., 177–9° C. Color—white.

Calc'd for $C_9H_9Cl_2NO_4S$ (percent): Cl, 23.78; S, 10.75. Found (percent): Cl, 24.24; S, 10.77.

2,4-dichloro - 5 - (N,N-dimethylsulfamyl)-N-(o-tolyl)-benzamide (III).—To 70.0 grams 2,4-dichloro-5 - N,N-dimethylsulfamyl benzoic acid in a 500 ml. round bottom flask was added 100 ml. thionyl chloride. Reaction was refluxed for 4½ hours, then concentrated to dryness. The residue was azeotroped with 4× 400 ml. benzene then suction dried.

Wt., 75 gm., M.P., 80° C.

Calc'd for $C_9H_8Cl_3NO_3S$ (percent): Cl, 33.59; S, 10.12. Found (percent): Cl, 32.62; S, 10.10.

The acid chloride was added to 500 ml. o-toluidine stirred at room temperature ½ hour, at 60° C., ½ hour, at 120° C. 1 hour. The reaction mixture was poured into 2 liters of water, acidified with HCl, filtered off solid, water washed, isopropanol washed, ether washed, sample dried.

Wt., 63.5 gm.; M.P., 182–3° C. Color—white.

Calc'd for $C_{16}H_{16}Cl_2N_2O_3S$ (percent): Cl, 18.31. Found (percent): Cl, 18.80.

IR—consistent.

2 - benzylamino - 4 - chloro - 5 - (N,N-dimethylsulfamyl)-N-(o-tolyl)benzamide (IV).—To 100 ml. benzylamine was added 25.0 grams of 2,4 dichloro-5-(N,N-dimethylsulfamyl)-N-(o-tolyl)-benzamide. Reaction was warmed gently to 120° C. and maintained four hours. Added reaction mixture to 400 ml. water, acidified. The solid was filtered off, recrystallized from 200 ml. 95% ethanol.

Wt., 14.2 gm.; M.P. 233–5° C. Color—white.

Calc'd for $C_{23}H_{24}ClN_3O_3S$ (percent): Cl, 7.74; S, 7.00. Found (percent): Cl, 7.87; S, 7.32.

1 - benzyl - 2 - methyl - 3 - (o-tolyl)-6-(N,N-dimethylsulfamyl) - 7 - chloro-1,2,3,4-tetrahydro-4-quinazolinone (V).—To a suspension of 2-benzylamino-4-chloro-5-(N,N-dimethylsulfamyl)-N-(o-tolyl)-benzamide, 10 grams, in 150 ml. glacial acetic acid was added 8.0 grams acetate followed by 2 ml. sulfuric acid. Reaction was stirred for 1 hour the solid which had separated was filtered off, dried. Wt. 8.0 gm. The solid was recrystallized from isopropanol, 6.1 gm.

White solid, M.P., 183–4° C.

Calc'd for $C_{25}H_{26}ClN_3O_3S$ (percent): C, 62.04; H, 5.41; Cl, 7.62; N, 8.68; S, 6.62. Found (percent): C, 62.33, 62.36; H, 5.41, 5.66; Cl, 6.46, 6.40; N, 8.86, 8.77; S, 6.64, 6.88.

7 - chloro - 6 - (N,N - dimethylsulfamyl)-2-methyl-3-(o-tolyl) - 1,2,3,4 - tetrahydro-4-quinazolinone.—Catalytic debenzylation of 8.0 gm. 1-benzyl-2-methyl-3-(o-tolyl) - 6 - (N,N - dimethylsulfamyl)-7-chloro-1,2,3,4-tetrahydro-4-quinazolinone using 6.0 gm. Pd/C 5% catalyst in 70 ml. methanol at 60 psr. gave on partial debenzylation, but on recrystallization from isopropanol gave pure 7 - chloro - 6 - (N,N - dimethylsulfamyl)-2-methyl-3-(o-tolyl)-1,2,3,4-tetrahydro-4-quinazolinone.

Wt., 2.1 gm.; M.P., 252–4° C. Color, white.

Calc'd: percent S, 8.14. Found: percent S, 8.41.

EXAMPLE IV 7-chloro-6-(N,N-dibenzylsulfamyl)-2-methyl-3-(o-tolyl)-1,2,3,4-tetrahydro-4-quinazolinone

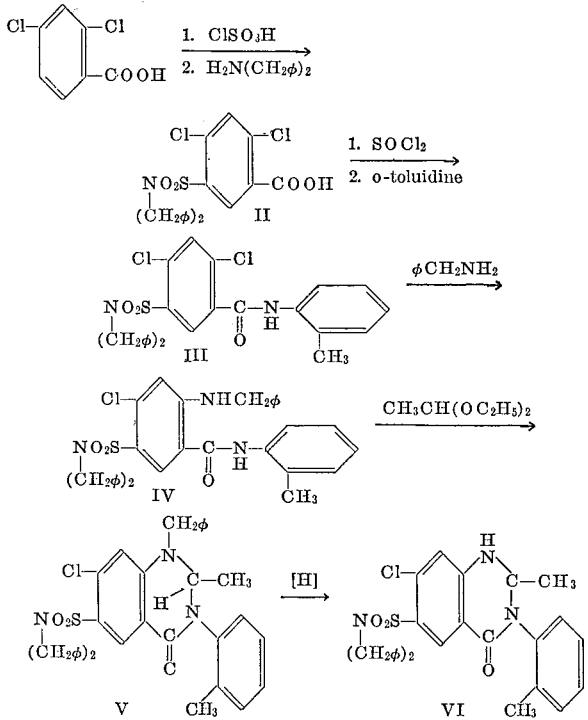

2,4 - dichloro - 5 - (N,N - dibenzylsulfamyl) - benzoic acid (II).—To a kilogram of chlorosulfonic acid in a nitrogen flushed 5 liter flask, 3 necked round bottom flask fitted with a stirrer and drying tube was cautiously added 200 gm. 2,4-dichlorobenzoic acid. The reaction was heated to and stirred at 160° C. four hours. The cooled reaction mixture was poured onto 10 kg. ice. The solid was filtered off and water washed, sucked dry. Approximately 80 grams of the wet damp cake was added to a solution of 100 gm. dibenzylamine in 1 liter water. Reaction was stirred at room temperature for one sour. Solid filtered off and recrystallized from 95% ethanol.

Wt. 26 gm.; M.P. 168–72° C.

2,4 - dichloro - 5 - (N,N - dibenzylsulfamyl) - N - (o-tolyl)-benzamide (III).—Twenty-five grams of 2,4-dichloro-5-(N,N-dibenzylsulfamyl)-benzoic acid was added to 100 grams of thionyl chloride. This was refluxed 2 hours then concentrated to dryness on the roto-vap-azeotroping with benzene. The residue was added to 300 ml. o-toluidine, stirred at room temperature 1 hour, placed on steam bath ½ hour, poured into 2 liters 3 N HCl. The solid was filtered off and recrystallized from 95% ethanol.

Wt., 10.2 gm.; M.P. 185–6° C.

2 - benzylamino - 4 - chloro - 5 - (N,N - dibenzylsulfamyl)-N-(o-tolyl)-benzamide (IV).—Ten grams of 2,4-dichloro - 5 - N,N - dibenzylsulfamyl-N-(o-tolyl)-benzamide was added to 25 ml. benzylamine, warmed to 125° C. and maintained for 2 hours. The reaction mixture was poured into water, solid filtered off, recrystallized from 95% ethanol.

Wt. 7.1 gm.; M.P., 182–4° C. Color, white.

Calc'd for $C_{35}H_{32}ClN_3O_3S$ (percent): Cl, 5.81; S, 5.25. Found (percent): Cl, 5.81, 5.38; S, 5.17.

IR, consistent.

1 - benzyl - 7 - chloro - 6-N,N-dibenzylsulfamyl-2-methyl - 3 - (o-tolyl)-1,2,3,4-tetrahydro-4-quinazolinone (V).—To a suspension of 7.0 gm. 2-benzylamino-4-chloro-5-N,N-dibenzylsulfamyl-N-(o-tolyl)-benzamide in 50 ml. glacial acetic acid was added 5.0 gm. 1,1-diethoxyethane and 3 ml. $H_2SO_4$ at 50° C. After 15 minutes the reaction was poured into 500 ml. water, solid separated, recrystallized twice from ethanol.

Wt., 4.8 gm.; M.P., 184–6° C.

Calc'd for $C_{37}H_{34}ClN_3O_3S$ (percent): Cl, 5.87; S, 4.95. Found (percent): Cl, 5.69, 5.62; S, 5.14.

7 - chloro - 6 - N,N - dibenzylsulfamyl-2-methyl-3-(o-tolyl) - 1,2,3,4 - tetrahydro - 4 - quinazolinone (VI).—Catalytic reduction of 4.0 gm. 1-benzyl-2-methyl-3-(o-tolyl) - 6 - (N,N - dibenzylsulfamyl) - 7 - chloro-1,2,3,4-tetrahydro-4-quinazolinone using 4.0 gm. 5% palladium/charcoal in 50 ml. ethanol gave 1.5 grams on ethanol recrystallization of a white solid. M.P., 224–6° C.

In the preceding specification the temperatures, wherever given, are in degrees centigrade.

Various modifications of the structural formula in column 1, lines 65–72 of the specification may be made, such as, for example, has been done for other tetrahydro-7-halo-6-sulfamyl-4-quinazolinones known to the art, without departing from the spirit of the invention which is concerned particularly with the aryl and alkaryl group on the 3-position, and the sulfamyl substituted as shown above. $R_1$, for example, may be an aralkyl such as benzyl or β phenethyl or substituted aralkyl such as ortho-chlorobenzyl, or the like, as well as hydrogen or lower alkyl. $R_2$, for example, may be alkenyl such as allyl, butenyl, and the like; also alkoxy such as methoxy, ethoxy, and the like; and aryl such as phenyl or naphthyl; and substituted aryl substituted as shown for the substituted aralkyl.

It will also be understood that any of the groups of $R_2$ may be substituted for the $R_2'$ hydrogen of the heterocycle.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, meleic, tartaric, and the acidic ion exchange resins such as carboxylic acid, phosphonic acid, and sulfonic acid cation exchange resins to give the therapeutically effective and nontoxic salts of the quinazolinone compound.

Other suitable specific compounds not mentioned above include 2-cyclopropyl-3-o-tolyl-6-N,N-diethylsulfamyl-7-chloro-1,2,3,4-tetrahydro-4-quinazolinone
1-methyl-2-methoxy-3-o-tolyl-6-N-acetylsulfamyl-7-chloro-1,2,3,4-tetrahydro-4-quinazolinone
1-methyl-3-o-tolyl-6-N,N-diphenylsulfamyl-7-chloro-1,2,3,4-tetrahydro-4-quinazolinone, and
3-o-tolyl-6-N-phenylsulfamyl-7-chloro-1,2,3,4-tetrahydro-4-quinazolinone.

I claim:
1. A compound of the formula:

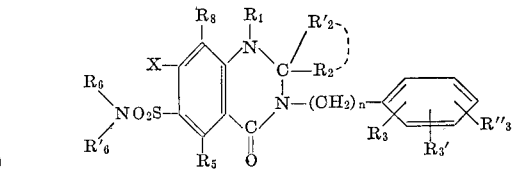

or the pharmaceutically acceptable salts thereof, in which X is halogen or trifluoromethyl; $R_6$ and $R_6'$ are loweralkyl, phenyl, or phenylloweralkyl; or $R_6$ is hydrogen and $R_6'$ is loweralkanoyl, phenyl, or phenylloweralkyl; $R_2$ and $R_2'$ are hydrogen, loweralkyl, loweralkenyl, thioloweralkyl, loweralkylthio, halogen substituted loweralkyl, phenylloweralkyl, phenyl, cycloloweralkyl, cycloloweralkylloweralkyl, loweralkoxy, loweralkoxyloweralkyl, or $R_2$ and $R_2'$ together are a lower polymethylene chain, morpholino, pyrrolidino, or piperazino; $R_1$ is hydrogen, phenylloweralkyl, hydroxyloweralkyl, loweralkoxyloweralkyl, or loweralkyl; $R_5$ and $R_8$ are hydrogen, loweralkyl, loweralkoxy, or loweralkoxyloweralkyl; $R_3$, $R_3'$ and $R_3''$ are hydrogen, loweralkyl, hydroxy, loweralkoxy, loweralkoxyloweralkyl, halogen, trifluoromethyl, sulfamyl, or amino, and $n$ is an integer from 0–4.

2. A compound having the structure of claim 1 in which $R_6$ is hydrogen and $R_6'$ is loweralkanoyl, phenyl or phenylloweralkyl, and the other groups are the same as those of claim 1.

3. A compound having the structure of claim 1 in which $R_6$ and $R_6'$ are loweralkyl and the other groups are the same as those of claim 1.

4. A compound having the structure of claim 1 wherein $R_6$ and $R_6'$ are loweralkyl, $R_2$ is hydrogen or loweralkyl, $R_2'$ is hydrogen; $R_1$, $R_5$, and $R_8$ are hydrogen; $R_3$, $R_3'$ and $R_3''$ are hydrogen or methyl, and $n$ is zero.

5. A compound of the structural formula of claim 1 in which $R_2$ and $R_2'$ are not joined to give a spiro compound and the groups are otherwise the same as in claim 1.

6. The compound of claim 1 in which the compound is 2-methyl-3-o-tolyl-6 - N,N - dimethylsulfamyl-7-chloro-1,2,3,4-tetrahydro-4-quinazolinone.

7. The compound of claim 1 in which the compound is 3-o-tolyl-6-N,N - dimethylsulfamyl-7-chloro-1,2,3,4-tetrahydro-4-quinazolinone.

References Cited

UNITED STATES PATENTS 3,360,518  12/1967  Shetty _____ 260—256.5

ALEX MAZEL, Primary Examiner

R. J. GALLAGHER, Assistant Examiner

U.S. Cl. X.R.

260—244, 518, 556; 424—79, 251

UNITED STATES PATENT OFFICE
CERTIFICATE OF CORRECTION

Patent No. 3,557,111　　　　　　　　　　Dated　January 19, 1971

Inventor(s)　Bola Vithal Shetty

It is certified that error appears in the above-identified patent and that said Letters Patent are hereby corrected as shown below:

Column 1, line 34, in the Abstract, delete "morpholino, pyrrolidino, or piperazino".

Column 2, lines 10-11, in the Specification, delete

"morpholino, pyrrolidino, or piperazino"

Column 12, lines 29-30, Claim 1, delete ", morpholino, pyrrolidino, or piperazino".

Signed and sealed this 4th day of May 1971.

(SEAL)
Attest:

EDWARD M. FLETCHER, JR.　　　　　　　WILLIAM E. SCHUYLER, JR.
Attesting Officer　　　　　　　　　　Commissioner of Patents